W. B. McPHERSON.
APPARATUS FOR ELECTRICAL TREATMENT OF ORES.
APPLICATION FILED APR. 20, 1909.
962,040.
Patented June 21, 1910.
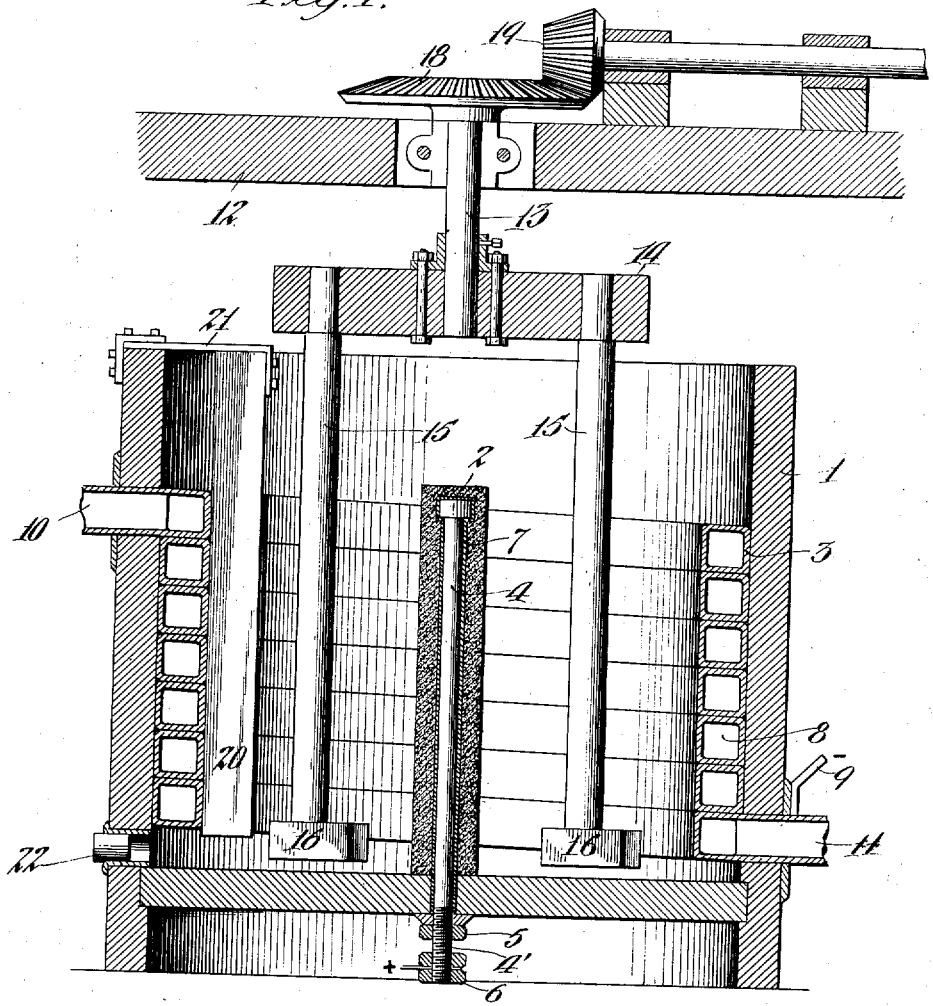
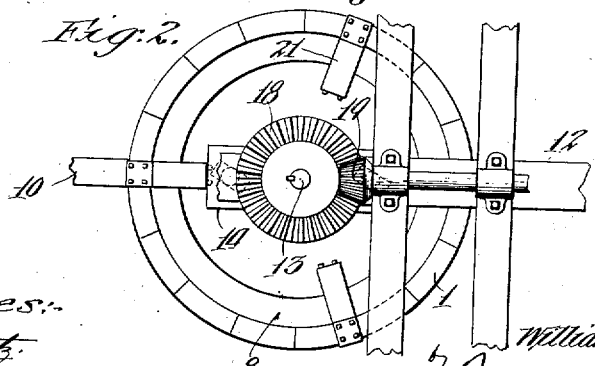

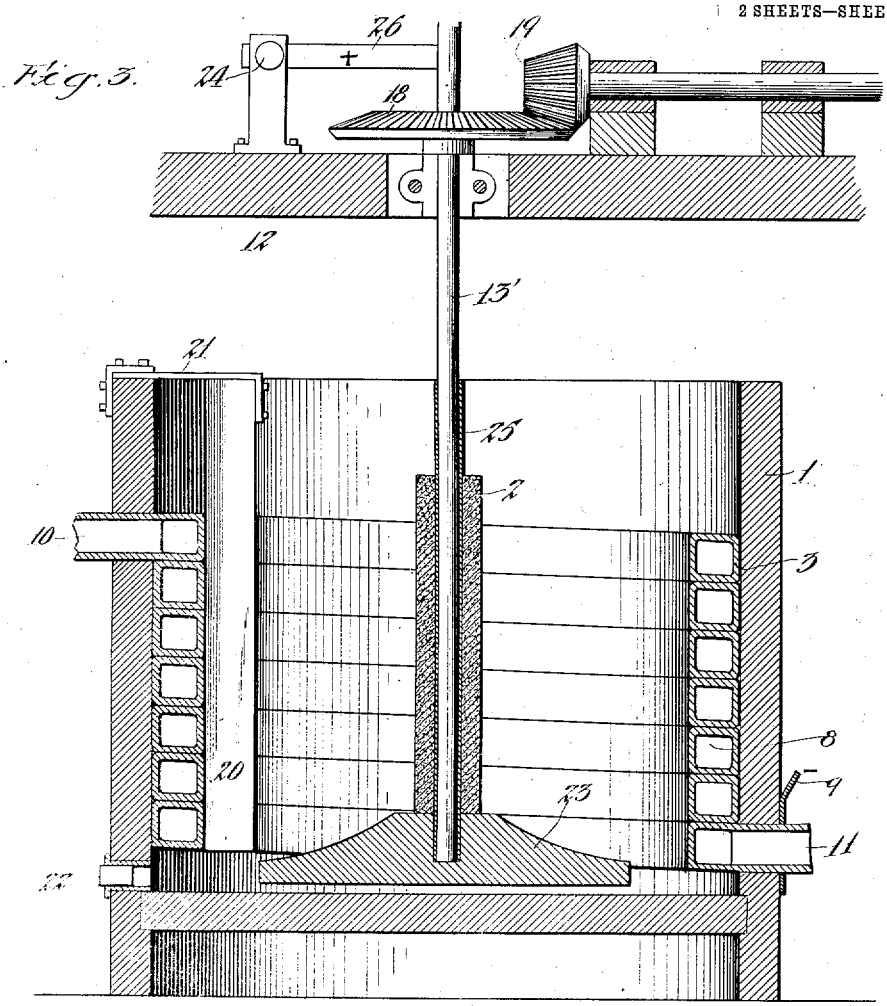

UNITED STATES PATENT OFFICE.

WILLIAM B. McPHERSON, OF LOS ANGELES, CALIFORNIA, ASSIGNOR OF ONE-HALF TO GAIL BORDEN, OF LOS ANGELES, CALIFORNIA.

APPARATUS FOR ELECTRICAL TREATMENT OF ORES.

962,040.  Specification of Letters Patent.  Patented June 21, 1910.

Application filed April 20, 1909. Serial No. 491,155.

*To all whom it may concern:*

Be it known that I, WILLIAM B. McPHERSON, a citizen of the United States, residing at Los Angeles, in the county of Los Angeles and State of California, have invented a new and useful Apparatus for Electrical Treatment of Ores, of which the following is a specification.

This invention relates to means for subjecting ores to the action of electric current.

The main object of the present invention is to provide, in an apparatus of this kind, means for heating the material being treated, simultaneously with the electrical action thereon.

Another object of the invention is to provide for agitation of the material.

A further object of the invention is to provide means for the above stated purpose which will be simple and cheap in construction and efficient and economical in operation.

Other objects of the invention will appear hereinafter.

The accompanying drawings illustrate the invention.

Figure 1 is a vertical section of the apparatus. Fig. 2 is a plan thereof. Fig. 3 is a vertical section of another form of the invention.

The apparatus comprises a tank, vat or receptacle 1 formed, for example, of wood, an inner or central electrode 2 supported axially in said vat, and an outer electrode 3 adjacent the wall of the vat and concentric with the central electrode. The electrode 2 may consist of a vertical post or bar of carbon or carbon composition having a core rod 4 molded therein, said core rod being fastened to the bottom of the tank 1 as by means of a screw portion 4' and nuts 5, other nuts 6 being provided to serve as means for connecting the electric circuit. The core rod 4 may be provided with a coating 7 of conducting material resistant to the electrolytic solution, for example, lead. The outer electrode 3 is tubular and has a conduit 8 throughout the same to provide for the passage of heating medium such as hot air or steam, etc. This combined electrode and heating element is wound preferably in a helical coil of suitable metal, preferably lead. In order to provide a uniform surface for equalizing the distribution of the current through the electrolyte and to utilize all of the space, the tube of which the electrode is formed is preferably square or rectangular in cross section, each run of the helix lying flat on the one beneath it so as to close the space and form a substantially cylindrical wall at the inside of the electrode. The distance of this wall from the central electrode 2 is uniform at all points. Electrode 3 is provided with means 9 for connection to an electric circuit. The inlet 10 and outlet 11 of this tubular electrode pass through the wall of tank 1 for the reception and delivery of the heating medium.

The agitating means is supported on a frame 12 extending across and above the tank 1 and having a vertical shaft 13 journaled thereon, said vertical shaft carrying a cross bar 14 provided with depending bars 15 which extend nearly to the bottom of the tank and may be provided at their lower ends with enlargements or plates 16 preferably disposed obliquely to the radial direction, so that in the rotation of the agitator these plates will force the contents of the tank outwardly and maintain a condition of circulation in the tank. The agitator shaft 13 is driven from a suitable driving shaft 17 by gearing 18, 19.

In order to prevent swirl of the contents of the vat which would simply result in circular motion without circulation, arresting means may be provided consisting of bars or obstructing members 20 supported at their upper ends by hangers 21 on the top of tank 1 and extending within the inner wall of the outer electrode 3. Means are provided at 22 for drawing off the contents of the tank.

The operation is as follows:—The material consisting of slimes or other solid matter, together with or containing water, or chemical solution, is charged into the tank 1 and occupies the space between the inner electrode 2 and the outer electrode 3. Said electrodes are connected to an electric circuit, the electrode 2 being, for example, connected as the anode, and the electrode 3 as the cathode in a direct current circuit. Simultaneously with the passage of electric current between the electrodes, heating medium, such as hot air, hot water, or steam, is passed through the outer tubular electrode to heat the contents of the tank. The agitating means 13, 14 is also set in motion to stir and circulate the contents of the tank.

Fig. 3 shows a construction embodying the invention in a different form, the central anode being rotative and carried by the agitating means. In this form of the invention the central shaft 13′ of the agitator extends down into the tank 1 and carries at its lower end a cross arm 23 which serves for agitation of the liquid in the tank. The inner electrode 2 in this case is tubular and surrounds and is carried by the vertical shaft 13′ so as to rotate therewith, a coating 25 of lead being provided for the shaft. Connection is made to this central electrode through the vertical shaft 13′ and the brush 26 provided with circuit connection means 24. In other respects the construction is as above described and the operation is the same as above set forth except that the central electrode rotates with the agitator.

What I claim is:—

1. An apparatus for electrical treatment of ores comprising a central electrode therein, an outer electrode concentric with the central electrode, said outer electrode being hollow and provided with means for passing heating medium therethrough.

2. An apparatus for electrical treatment of ores comprising a central electrode therein, an outer electrode concentric with the central electrode, said outer electrode being formed of a tube wound in the form of a helix and provided with means for the passage of heating medium therethrough.

3. An apparatus for electrical treatment of ores comprising a central electrode therein, an outer electrode concentric with the central electrode, said outer electrode being formed of a tube wound in the form of a helix and provided with means for the passage of heating medium therethrough, said tube being rectangular in cross section, the inner face thereof forming a cylindrical surface.

4. An apparatus for electrical treatment of ores comprising a tank, a central electrode therein, an outer electrode concentric with the central electrode, said outer electrode being hollow and provided with means for passing heating medium therethrough, an agitating means comprising a rotatable member having bars extending within the tank, and means for rotating said rotatable member.

5. An apparatus for electrical treatment of ores comprising a tank, a central electrode therein, an outer electrode concentric with the central electrode, said outer electrode being hollow and provided with means for passing heating medium therethrough, an agitating means comprising a rotatable member having bars extending downwardly within the tank, and means for rotating said rotatable member, said bars having obliquely directed enlargements at their lower ends.

6. An apparatus for electrical treatment of ores comprising a tank, a central electrode therein, an outer electrode concentric with the central electrode, said outer electrode being hollow and provided with means for passing heating medium therethrough, an agitating means comprising a rotatable member having bars extending downwardly within the tank, means for rotating said rotatable member, and means extending downwardly within the electrode to obstruct rotative movement of the contents of the tank.

In testimony whereof, I have hereunto set my hand at Los Angeles, California, this 8th day of April 1909.

WILLIAM B. McPHERSON.

In presence of—
ARTHUR P. KNIGHT,
FRANK L. A. GRAHAM.